United States Patent [19]

Power

[11] Patent Number: 5,016,573
[45] Date of Patent: May 21, 1991

[54] BIRD OBSERVATION ENCLOSURE, SELECTIVELY LIMITING, SQUIRREL RESISTANT

[76] Inventor: Donald E. Power, 3588 Raber Ter., Uniontown, Ohio 44685

[21] Appl. No.: 488,616

[22] Filed: Mar. 6, 1990

[51] Int. Cl.$^5$ .............................................. A01K 39/00
[52] U.S. Cl. ..................................... 119/57.9; 119/23; 119/57.8
[58] Field of Search ................... 119/57.9, 52.2, 52.3, 119/52.4, 57.8, 26, 23

[56] References Cited

U.S. PATENT DOCUMENTS

| | | | |
|---|---|---|---|
| 2,524,502 | 10/1950 | Wilkinson | 119/57.9 |
| 3,301,217 | 1/1967 | Prowinsky | 119/57.9 |
| 3,316,883 | 5/1967 | Johnson | 119/57.9 |
| 4,167,917 | 9/1979 | Noll | 119/57.9 |
| 4,434,745 | 3/1984 | Perkins | 119/57.9 |
| 4,846,110 | 7/1989 | Reynolds | 119/23 |

Primary Examiner—John G. Weiss

[57] ABSTRACT

This invention relates to a hanging type or ground supported bird observation enclosure, selectively limiting, squirrel resistant, provisioned with means for installation of at least one feed or drink receptacle within interior confines. Comprising the enclosure is an open mesh body structure, ported by an plurality of circular openings, sealed by a closure on one end, the other having at least one cover, for feed or drink replenishment.

9 Claims, 5 Drawing Sheets

BIRD OBSERVATION ENCLOSURE, SELECTIVELY LIMITING, SQUIRREL RESISTANT

FIELD OF THE INVENTION

This invention relates in general to the field of animal husbandry. More especially, the present invention relates to a novel bird observation enclosure, selectively limiting, squirrel resistant, provisioned for installation of at least one feed or drink receptacle within the interior confines.

BACKGROUND OF THE INVENTION

People observing and providing supplemental feed or drink to wild birds are often dismayed by the over-aggressiveness of certain species of birds, and squirrels.

One bird, in particular, the housefinch, a small highly aggressive bird introduced from the Western States to the East Coast in 1940, has so vastly increased in numbers, that it is now a major competitor among other small birds.

These housefinch, and squirrels tend to dominate the feed or drink areas, making it difficult, if not impossible for smaller more timid birds such as the goldfinch and blackcapped chickadees to participate.

There is a need for a squirrel resistant apparatus which would selectively limit the size of aggressive birds, such as the housefinch, while at the same time, allow smaller, more timid birds, such as the goldfinch and blackcapped chickadee access to feed or drink unharassed, within an enclosure, allowing maximum viewing opportunities to the providers.

PRIOR ART

Weight-responsive feeders, as in U.S. Pat. No. 4,541,362, have been but marginal in limiting access of squirrels and birds, due to the weight variations among the various species.

Lattice-work fencing, described in U.S. Pat. No. 4,434,745 has effectively been positioned around feeders to discourage squirrels, with no bird limiting qualities.

Access controlled by the position of feed pan and truncated cone, described in U.S. Pat. No. 4,144,842, limits some birds. While limiting access, observation viewing is greatly restricted.

In the Duncraft 'Wire Wonder' pictured on page 16 of the winter, 1989 catalog, and Rice's "Chickadee Haven Feeder", described in Rice's literature, Niagara Falls, Ontario, Canada, reformed openings made within fencing materials surround a feeder. While limiting access to squirrels and larger birds, it is evident by picture and word, other undesirable birds, such as the housefinch, are allowed access through the deformed openings.

While the precise merits, features and advantages of the cited references are numerous, none of them achieves or fulfills the purpose of this present invention, the bird observation enclosure, selectively limiting, squirrel resistant.

SUMMARY OF THE INVENTION

It is an object of this invention to provide a squirrel-resistant enclosure wherein selectively limited birds, such as the goldfinch or blackcapped chickadee, may be observed feeding or drinking unharassed.

Another object of this invention is to provision with means within the enclosure whereby at least one feed or drink receptacle may be installed, readily accessed for replenishment.

Yet another object of this invention is to provide a means whereby the enclosure could be hung above the ground.

Another object of this invention is to provide an enclosure with means whereby it could be supported on the ground.

Still another object of this invention is to provide an enclosure which is easy to assemble, and is inexpensive to manufacture.

In general, the foregoing objects can be accomplished as described in the following preferred embodiment.

The enclosure in the preferred embodiment comprises a squirrel-gnaw-resistant open mesh wire structure, generally cylindrical, closed at the lower end, the upper end having a removable squirrel-gnaw-resistant cover secured to the body with a semi-rigid hanging means. Said hanging means functioning as an apparatus for cover retention and means for cover positioning alignment during feed or drink replenishment, would in addition provide a means for hanging the enclosure above the ground.

The cover would further comprise a handling means, for cover removal, on its outer surface, such as a knob. On the inner surface fastening means, such as a hook, would be affixed for attaching a feed or drink receptacle. Weight of replenished feed or drink receptacle would provide supplemental means for cover retention, further increasing squirrel resistance.

Vertical length of the body would be in excess of the feed or drink receptacle to be installed within interior confines.

Diameter of body would be such as to accommodate select birds, while clinging or perching on the feed or drink receptacle.

The body walls would contain a plurality of spaced apart ports having substantially circular openings for bird ingress/egress, sized to admit only those desired selected limiting species.

These and other features of the invention will become more apparent to those skilled in the art, by referring to the accompanying detailed specification and drawings described herein.

The structure and operation of the preferred embodiment of the invention will now be presented after first briefly describing the drawings.

DRAWINGS

Figure 1:
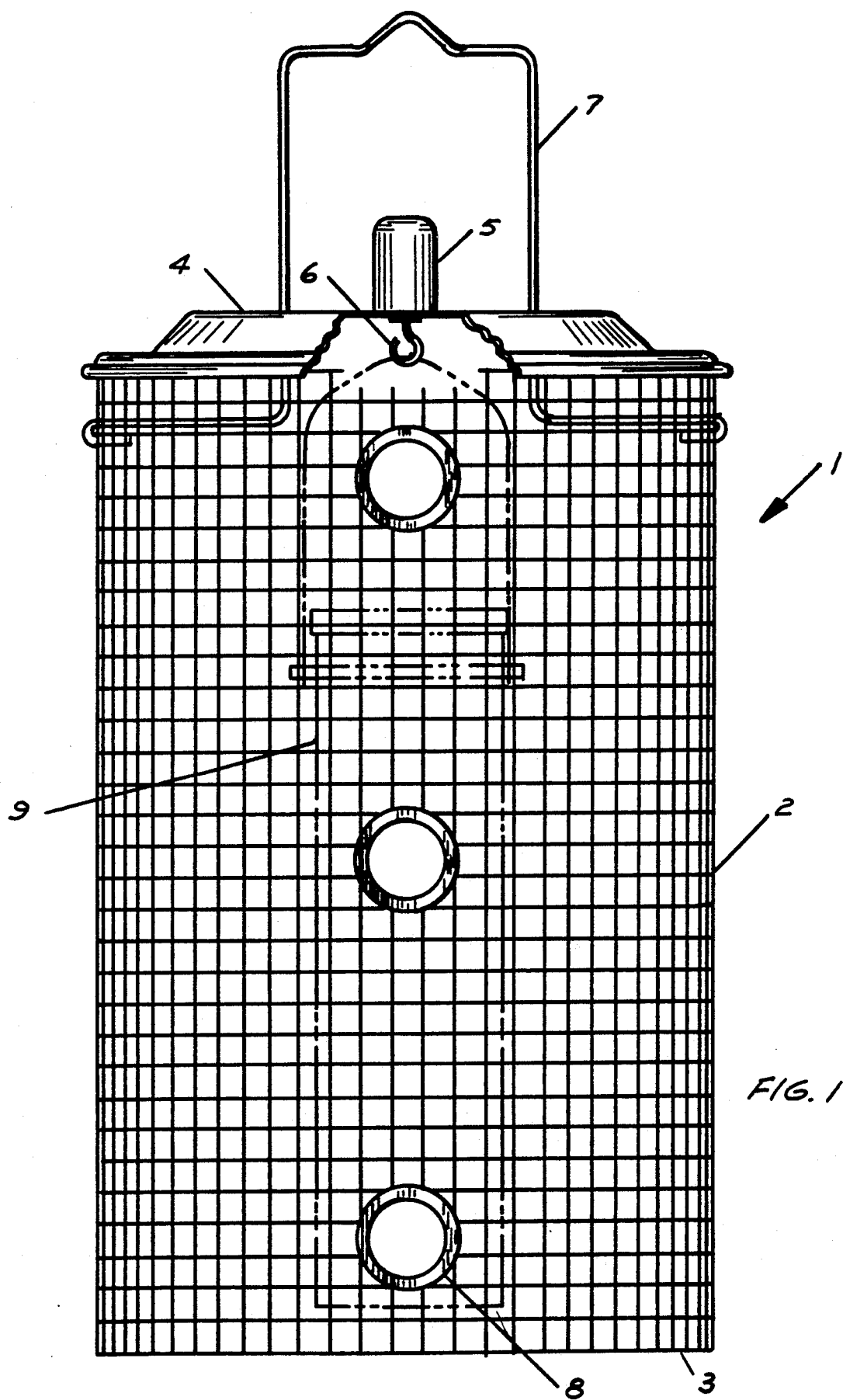
FIG. 1 is a side elevation view of the preferred embodiment of the invention, shown partially in section.

While the invention is susceptible of embodiment in many forms, there will be shown in the drawings, and described herein in detail, a preferred embodiment of the invention with the understanding that the present disclosure is to be considered as an exemplification of the invention in principle and is not intended to limit the broad aspect of the invention to embodiment illustrated.

Referring now to FIG. 1, the novel enclosure of this invention in the preferred embodiment comprises the following:

FIG. 1 shows an enclosure 1, for encompassing a feed or drink receptacle 9, having an axis laterally spaced by a generally cylindrical, squirrel-gnaw-resistant substantially open mesh body 2 structure, having generally square openings of less than 0.62 inch, smaller than the skull of the selectively limited birds. Overall length of body 2 along said axis sufficient to provide an envelope for installing a feed or drink receptacle would be less than 37.00 inches. Body 2 sidewall laterally spaced from said axis sufficiently to allow ample envelope for select birds clinging or perching on said feed or drink receptacle 9 within interior confines, would have an outside diameter greater than 9.00 inches. Such open body 2 structure would be an industrial standard material, such as wire cloth or welded wire. These standards present a vast selection of materials, wire spacing, and corrosion resistant finishes, at low cost. The lower closure 3 sealing the first end opening of body 2 would be fabricated of a similar material.

A plurality of ports 8, each having a substantially circular opening sized to selectively limit bird access to the interior of said enclosure 1, would have an inside diameter of approximately 1.125 inch. This would permit birds such as goldfinch or blackcapped chickadees access to interior of said enclosure 1, while excluding housefinch. Said ports 8 would be spaced apart and affixed to the vertical wall of body 2. These ports 8 would be an inexpensive industrial standard, or modified, plastic snap bushing which would be pressed into an aperture provided within the sidewalls of the wire mesh body 2 structure.

A closure cover 4, substantially circular in shape, sealing the second end opening of body 2 would further comprise a handling means 5, for cover removal, affixed to outer surface, and a small fastening means 6, such as a hook, for attachment of feed or drink receptacle 9, affixed to the inner surface of cover 4. Said cover 4 in turn would be fabricated from an inexpensive industrial 'off-the-shelf' product, such as a baking container, a squirrel-gnaw-resistant material.

Extending outwardly from and protruding through said cover 4 would be a hanging means 7, such as a semi-rigid steel wire member, less than 0.125 inch diameter, shaped as required for attachment to upper side wall mesh of body 2, and constituting a means for hanging the enclosure above the ground.

Of course, numerous other embodiments with modifications come to mind without departing from the spirit of the invention.

Figure 3:
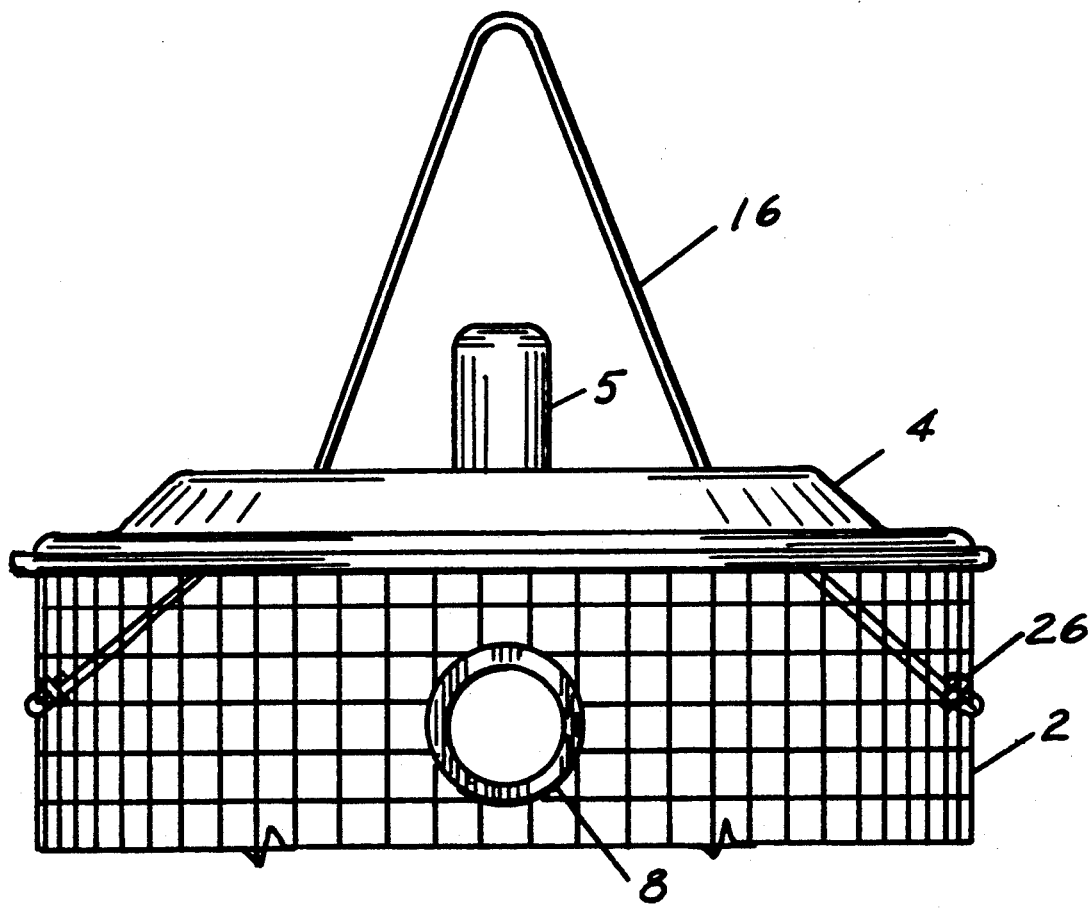
FIG. 3 is a partial side elevation view delineating an alternate hanging means.

As an example, in FIG. 3, the hanging means 16 would take the form of a flexible member of cord or wire, secured with a wire clip 26.

Figure 2:
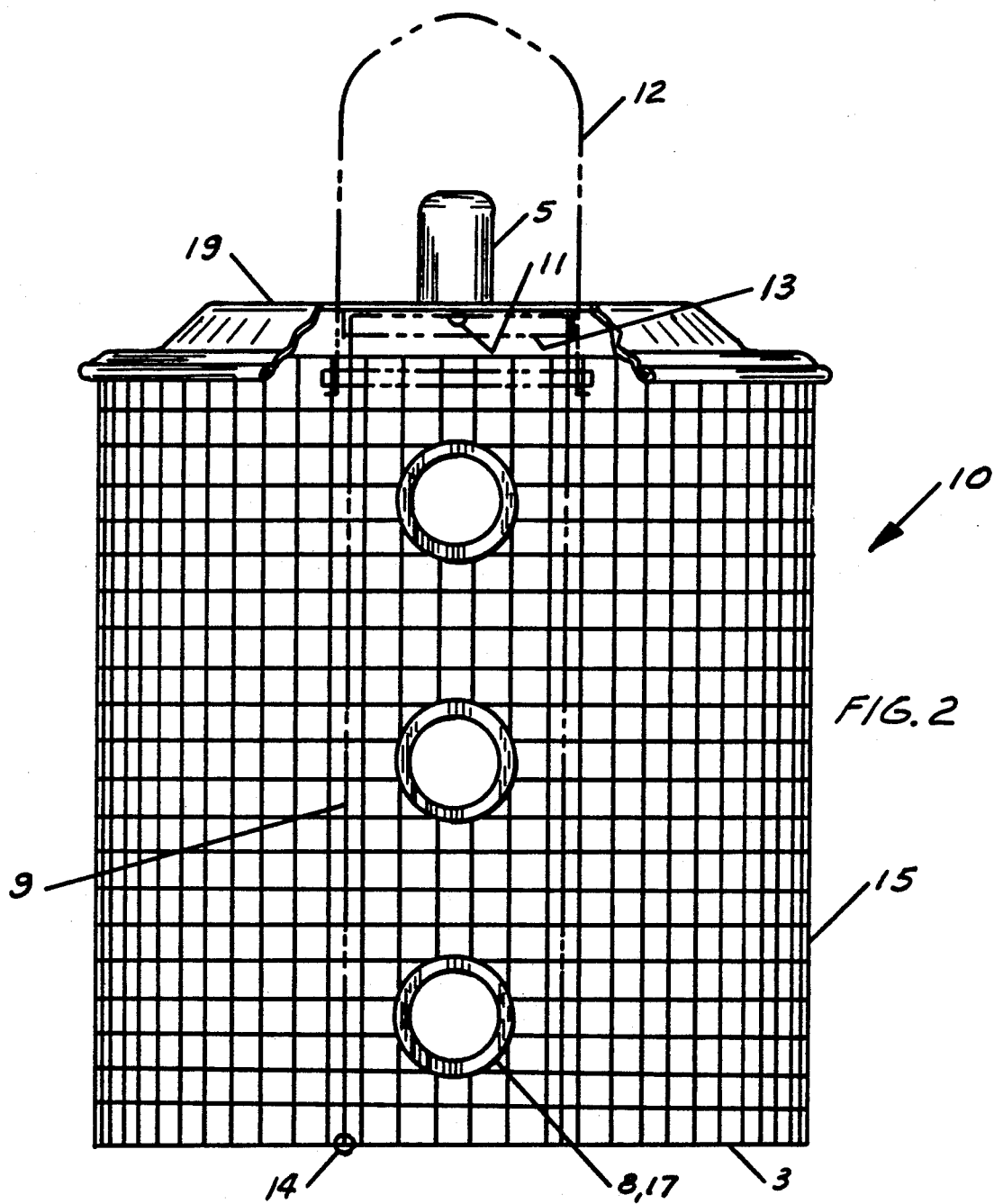
FIG. 2 is a side elevation view, shown partially in section, depicting an alternate enclosure incorporating the hanging means of a feed or drink receptacle to be installed within enclosure.

In an alternate embodiment shown in FIG. 2, a shorter, less costly enclosure 10 incorporating body 15, fabricated of a similar material and in like manner as body 2, incorporating ports 8 or 17 also in like manner as in enclosure 1, would incorporate protruding through and outwardly of cover 19, the integral hanging means 12 of the feed or drink receptacle to be mounted within the interior confines of said enclosure 10. If desired, receptacle replenishment cap 13 could be attached to inner surface of cover 19 by fastening means 11, such as a screw. The base of feed or drink receptacle 9 would be attached to lower closure 3 with fastening means 14, such as a bent wire clip.

Figure 4:
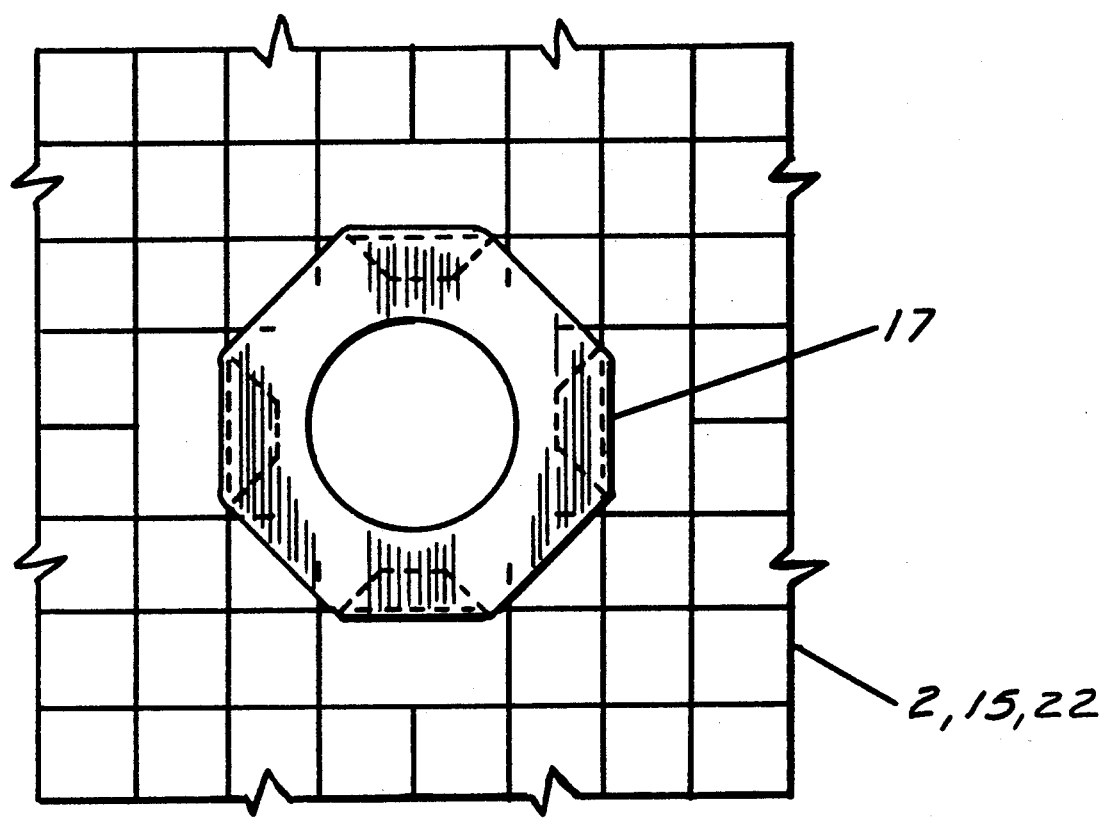
FIG. 4 is a partial side elevation view of an alternate port design.
Figure 5:
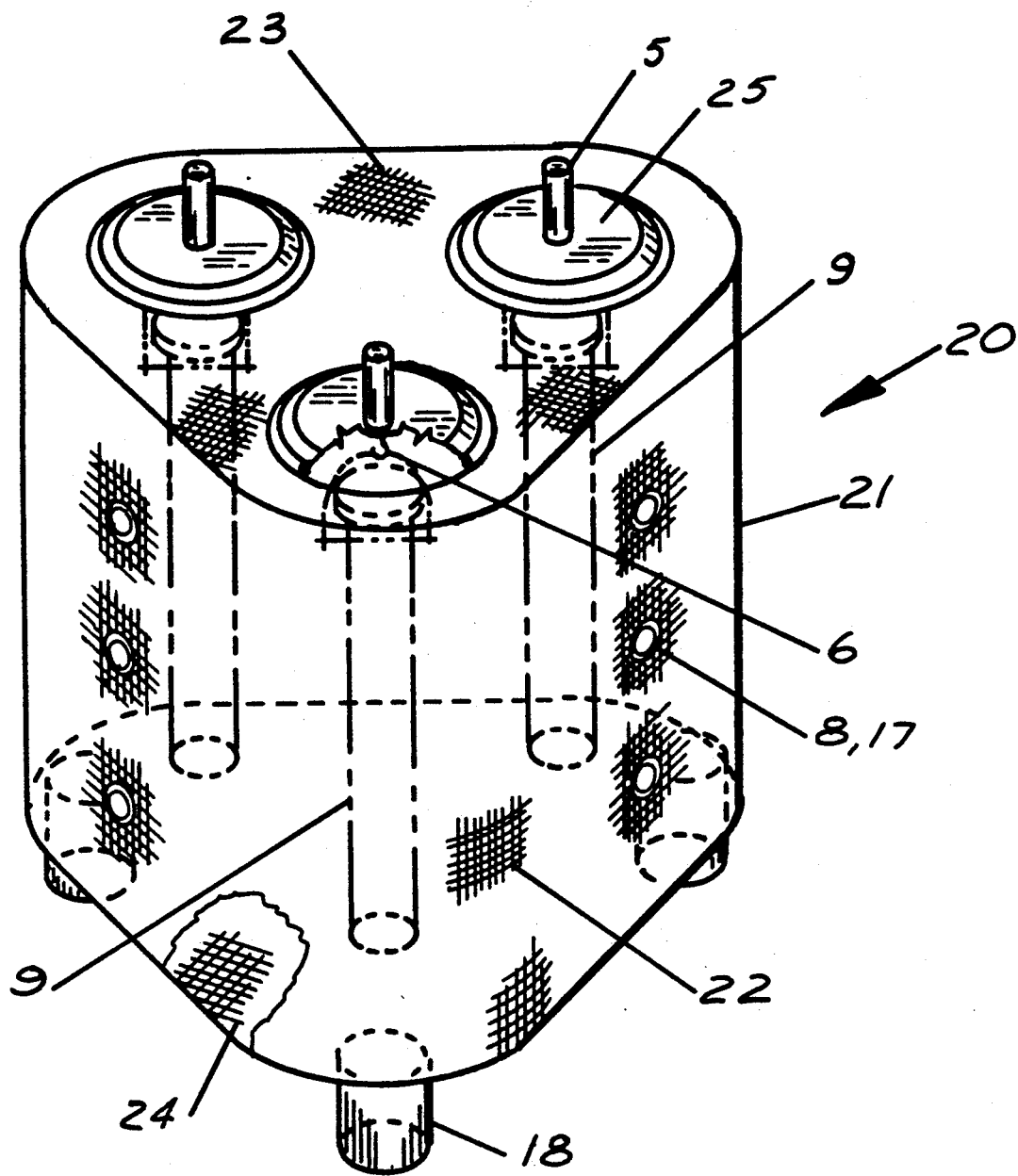
FIG. 5 is a perspective view, shown partially in section, of an alternate enclosure embodiment which is ground supported.

An alternate port 17 design shown in FIG. 4 would be fabricated with suitably sized hole, approximately 1.125 inch diameter, from a thin sheet metal, less than 0.050 inch thick, affixed with integrally attached tabs, to an aperture provided within body 2 or 15, or 22 sidewall mesh of FIG. 1 or FIG. 2, or FIG. 5.

In some cases of enclosure 1 more than one feed or drink receptacle 9 may be desired to be installed. Additional handling means 5 affixed to outer surface of cover 4, and more than one fastening means 6 affixed to the inner surface of the cover 4, for attachment of feed or drink receptacle 9, may be required.

Yet another embodiment of this invention would be a ground supported enclosure 20 of FIG. 5 comprising the following: at least one cover 25, each said cover comprising handling means 5 on outer surface, for cover 25 removal, in addition to fastening means 6 affixed to inner surface, for attachment of feed or drink receptacle 9, would seal an aperture on wire mesh upper surface 23 of enclosure 20. Outer walls 22 of body 21 would in like manner as in enclosure 1 of FIG. 1, comprise a plurality of spaced apart ports 8 or 17. Body 21 sidewalls 22 and lower closure 24, would be of similar materials as those found in corresponding features of enclosure 1 of FIG. 1. Upper surface 23 would be of a similar material. Cover 25 would be of a similar material and design as cover 5 of FIG. 1.

At least three provisioning means 18, such as a tubular structure would be incorporated into lower closure 24 enabling ground support of the enclosure 20.

Further embodiments can be invisioned by those skilled in the arts of the field of this invention.

What is claimed is:

1. An enclosure for encompassing a bird feed or drink receptacle, said enclosure comprising:
A. a body, substantially open structure, squirrel-gnaw-resistant material, surrounding an axis, a sidewall of said body being laterally spaced from said axis sufficiently to allow ample envelope for select birds clinging or perching on said feed or drink receptacle within interior confines;
B. said body extending along said axis sufficiently to provide envelope for installing said feed or drink receptacle within interior confines of said enclosure:
C. said body sidewalls having a plurality of spaced apart ports therein, said ports having substantially circular openings sized to selectively limit bird access to the interior of said enclosure;
D. said body comprising a first end opening and a second end opening;
E. a squirrel-gnaw-resistant lower closure sealing the first end opening of said body.

2. The enclosure of claim 1 wherein said open body structure is a wire mesh having an opening size smaller, in at least one axis, than the skull of the selectively limited birds.

3. The enclosure of claim 2 wherein a closure sealing the second end opening of said body is a squirrel-gnaw-resistant cover.

4. The enclosure of claim 3 wherein further comprisement is at least one bail-type hanging means engaging said sidewalls and said cover for enabling the hanging of said enclosure above the ground.

5. The enclosure of claim 4 wherein said cover further comprises at least one graspable handling means affixed to outer surface of said cover for cover removal, and at least one fastening means affixed to inner surface of said cover, for attachment of said feed or drink receptacle to be installed within confines of said enclosure.

6. The enclosure of claim 5 wherein said bail-type hanging means is a semi-rigid member.

7. The enclosure of claim 5 wherein said bail-type hanging means is a flexible member.

8. The enclosure of claim 4 wherein said cover comprises at least one graspable handling affixed to outer surface of said cover, for cover removal, and at least one fastening means for attaching feed or drink receptacle replenishment cap to inner surface, said cover further being provisioned with means for acceptance of at least one hanging means.

9. The enclosure of claim 1 wherein the second end opening of said body is sealed by a squirrel-gnaw-resistant closure.

* * * * *

UNITED STATES PATENT AND TRADEMARK OFFICE
CERTIFICATE OF CORRECTION

PATENT NO. : 5,016,573

DATED : May 21, 1991

INVENTOR(S) : Donald E. Power

It is certified that error appears in the above-identified patent and that said Letters Patent is hereby corrected as shown below:

Col. 4, line 47, claim 1B, should read "sure;" and not --sure:--.

Col. 4, line 60, claim 3, should read "the closure" and not --a closure--.

Col. 5, line 10, claim 8, should read "handling means affixed" and not --handling affixed--.

Signed and Sealed this

Twenty-sixth Day of May, 1992

Attest:

DOUGLAS B. COMER

Attesting Officer     Acting Commissioner of Patents and Trademarks